US009948886B2

(12) United States Patent
Torgersrud

(10) Patent No.: US 9,948,886 B2
(45) Date of Patent: *Apr. 17, 2018

(54) VIDEO COMMUNICATIONS IN DETENTION ENVIRONMENTS

(71) Applicant: INTELMATE LLC, San Francisco, CA (US)

(72) Inventor: Richard Torgersrud, San Francisco, CA (US)

(73) Assignee: Intelmate LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/981,893

(22) Filed: Dec. 28, 2015

(65) Prior Publication Data

US 2016/0119580 A1    Apr. 28, 2016

Related U.S. Application Data

(63) Continuation of application No. 13/843,590, filed on Mar. 15, 2013, now Pat. No. 9,225,935.

(51) Int. Cl.
*H04N 7/14* (2006.01)
*H04M 3/42* (2006.01)
*H04W 68/00* (2009.01)

(52) U.S. Cl.
CPC ........ *H04N 7/147* (2013.01); *H04M 3/42374* (2013.01); *H04W 68/005* (2013.01)

(58) Field of Classification Search
CPC ...... H04M 3/42136; H04M 3/42229–3/42272; H04M 3/42348–3/42382; H04M 3/432–3/4365; H04M 7/006; H04M 7/0078; H04M 2203/2027; H04M 2203/2055; H04M 2203/2083; H04W 68/005
USPC ................... 348/14.01–14.16; 370/351–357; 379/37–52, 67.1–88.28; 709/201–207, 709/217–248

See application file for complete search history.

(56) References Cited

U.S. PATENT DOCUMENTS 5,930,700 A * 7/1999 Pepper .................. H04M 1/663
379/211.02
6,215,859 B1 * 4/2001 Hanson ................. H04M 3/533
379/88.12

(Continued)

*Primary Examiner* — Hemant Patel
(74) *Attorney, Agent, or Firm* — Venable LLP; Jeffri A. Kaminski; Leslie A. Lee

(57) ABSTRACT

Methods for providing a video communication with a detention environment are provided. In one aspect, a method includes receiving a request from a first user to initiate a video communication with a second user. The video communication uses a shared communications terminal located in a detention environment. The method further includes determining, based on a schedule of the second user, whether the second user is currently available for participating. The method also includes sending a notification to the second user to accept the request when the determination indicates the second user is currently available, and receiving a response to the notification to accept the request. The method further includes initiating the video communication when the response indicates the second user has accepted the request. Either of the users is detained in the detention environment. Systems and machine-readable media are also provided.

2 Claims, 5 Drawing Sheets

(56) References Cited

U.S. PATENT DOCUMENTS

| | | | |
|---|---|---|---|
| 6,351,525 B1 | 2/2002 | Rodriguez | |
| 6,795,541 B2 | 9/2004 | Oren | |
| 6,856,598 B1 | 2/2005 | Stanfield | |
| 7,006,613 B2 | 2/2006 | Novak et al. | |
| 7,046,779 B2 | 5/2006 | Hesse | |
| 7,095,835 B2* | 8/2006 | Brown | H04M 3/382 370/221 |
| 7,106,843 B1* | 9/2006 | Gainsboro | H04M 3/2281 379/191 |
| 7,106,851 B2 | 9/2006 | Tang et al. | |
| 7,155,001 B2 | 12/2006 | Tiliks et al. | |
| 7,243,123 B1 | 7/2007 | Allen et al. | |
| 7,519,375 B2* | 4/2009 | Polozola | H04L 12/1895 455/404.1 |
| 7,672,440 B2* | 3/2010 | Chen | H04L 67/24 370/352 |
| 8,031,849 B1* | 10/2011 | Apple | H04M 15/08 379/114.03 |
| 8,670,546 B2 | 3/2014 | Wohlert | |
| 8,929,525 B1* | 1/2015 | Edwards | H04N 7/147 348/14.01 |
| 9,106,789 B1* | 8/2015 | Shipman, Jr. | H04N 7/147 |
| 9,225,935 B2* | 12/2015 | Torgersrud | H04M 3/42374 |
| 2005/0201362 A1 | 9/2005 | Klein et al. | |
| 2006/0087555 A1* | 4/2006 | Boyd | H04N 7/15 348/14.09 |
| 2008/0000966 A1* | 1/2008 | Keiser | G06Q 10/10 235/382 |
| 2008/0201158 A1 | 8/2008 | Johnson et al. | |
| 2012/0281058 A1 | 11/2012 | Laney et al. | |
| 2013/0194377 A1* | 8/2013 | Humphries | H04N 7/15 348/14.08 |
| 2014/0192132 A1* | 7/2014 | Avery | G06Q 10/10 348/14.01 |
| 2014/0218466 A1* | 8/2014 | Bloms | H04N 7/152 348/14.09 |

\* cited by examiner

VIDEO COMMUNICATIONS IN DETENTION ENVIRONMENTS

CROSS-REFERENCE TO RELATED APPLICATIONS

The present application is a continuation of U.S. patent application Ser. No. 13/843,590, entitled "Video Communications in Detention Environments," filed on Mar. 15, 2013, which is hereby incorporated by reference in its entirety for all purposes.

BACKGROUND

Field

The present disclosure generally relates to computer systems, and more particularly to the use of a computer system to communicate between individuals.

Description of the Related Art

Many detention environments (or "controlled facilities"), such as correctional facilities (e.g., detention center, jail, or prison), military installations, or even secure office locations have a limited number of communication terminals (e.g., telephones, video visitation stations, etc.) by which a large number of detainees (or "residents," e.g., detainees, inmates, prisoners, confined individuals, parolees, probationers) may communicate with visitors, family, and friends. As detainees usually do not have access to terminals outside the physical space in which they reside, a detainee must commonly reserve a terminal or book use of the terminal (e.g., by approaching and laying claim to the terminal) at a time for a scheduled visit (e.g., a scheduled telephone call or video call) so as to ensure the availability of the terminal to the detainee. As such, terminals inside detention environments often require pre-arranged scheduling of visits, which itself requires that one party (e.g., a detainee) invite the other party (e.g., a family member or friend) to visit in advance of the visit.

SUMMARY

According to one embodiment of the present disclosure, a system for providing a video communication with a detention environment is provided. The system includes a memory that includes instructions, and a processor. The processor is configured to execute the instructions to receive a request from a first user to initiate a video communication with a second user, the video communication using a shared communications terminal located in a detention environment, and determine, based on a schedule of the second user, whether the second user is currently available for participating in the video communication. The processor is also configured to execute the instructions to send a notification to the second user to accept the request to initiate the video communication when the determination indicates the second user is currently available for participating in the video communication, and receive a response to the notification to the second user to accept the request to initiate the video communication. The processor is further configured to execute the instructions to initiate the video communication between the first user and the second user when the response to the notification indicates the second user has accepted the request to initiate the video communication. One of the first user and the second user is detained in the detention environment.

According to another embodiment of the present disclosure, a method for providing a video communication with a detention environment is provided. The method includes receiving a request from a first user to initiate a video communication with a second user, the video communication using a shared communications terminal located in a detention environment, and determining, based on a schedule of the second user, whether the second user is currently available for participating in the video communication. The method also includes sending a notification to the second user to accept the request to initiate the video communication when the determination indicates the second user is currently available for participating in the video communication, and receiving a response to the notification to the second user to accept the request to initiate the video communication. The method further includes initiating the video communication between the first user and the second user when the response to the notification indicates the second user has accepted the request to initiate the video communication. One of the first user and the second user is detained in the detention environment.

According to a further embodiment of the present disclosure, a machine-readable storage medium includes machine-readable instructions for causing a processor to execute a method for providing a video communication with a detention environment is provided. The method includes receiving a request from a first user to initiate a video communication with a second user, the video communication using a shared communications terminal located in a detention environment, and determining, based on a schedule of the second user, whether the second user is currently available for participating in the video communication. The method also includes sending a notification to the second user to accept the request to initiate the video communication when the determination indicates the second user is currently available for participating in the video communication, and receiving a response to the notification to the second user to accept the request to initiate the video communication. The method further includes initiating the video communication between the first user and the second user when the response to the notification indicates the second user has accepted the request to initiate the video communication. One of the first user and the second user is detained in the detention environment.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
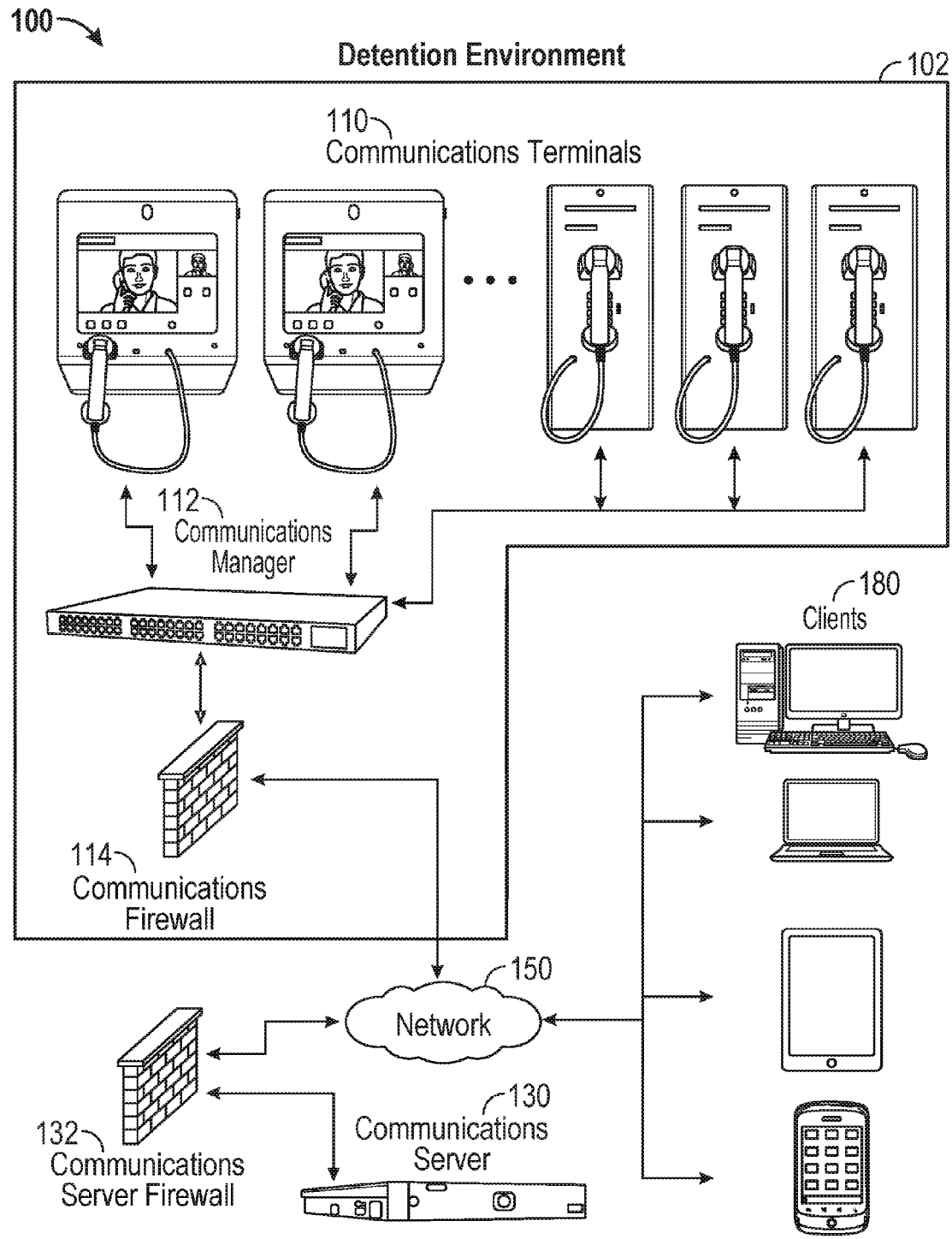
FIG. 1 illustrates an example architecture for providing video communications with a detention environment.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

Sufficiently advanced scheduling of a video call between a detainee in a detention environment and outside contacts, such as the detainee's friends and family, outside of the detention environment, often limits the total number and frequency of video visitations in which a detainee can participate. The ability to conduct spontaneous video calls as provided by the system disclosed herein would increase the number and frequency of video visitations in which a detainee can participate. The disclosed system will allow, for example, spontaneous video visitation within the limitations and structure of the detainee's activities, the detention environment's schedule and rules, and the outside contacts' schedules, preferences, and activities. As such, the disclosed system is capable of respecting a pre-defined scheduling restriction or scheduling preferences of both the detainee and the outside contact.

For example, a friend of a detainee wishes to video visit with the detainee and wishes to do so immediately if the detainee is available. The friend selects the detainee's designation onscreen using a smartphone with an application configured for use with the disclosed system ("client application") and selects an option to visit immediately. The disclosed system then attempts to contact the detainee, which may include an audio cue, such as a distinct sound or a computer voice emitted from a communications terminal in the detention environment announcing, "a video visit is available now for [detainee name]." In certain aspects, if the detainee has access to a personal mobile device in the detention environment, the disclosed system may send a notification and/or route the video visit to the detainee's mobile device.

As another example, a detainee logs into a communications terminal configured for use with the disclosed system, selects a desired family member, and indicates that the detainee would like to immediately video visit the family member. The disclosed system first checks the family member's availability. For example, the disclosed system may check whether the family member is currently logged into the client application. The disclosed system may also check if the family member has already indicated that he would like to be contacted via text message or email if a detainee wishes to visit, and give the family member a web browser notification or a link via text message or email that can be clicked in order to expedite logging into the client application and navigating to the part of the application where a pending visit may be connected with the requesting party, e.g., the detainee.

Both of the disclosed examples allow outside contacts to video visit with a detainee without requiring the use of a scheduling system, which is time consuming and requires booking visits in the future rather than immediately. As such, the time between initiation of a video visit request and a confirmation or rejection is, in certain aspects, limited to a maximum of several minutes so as to reduce the potential for anxiety for either party, but especially that of the detainee, as well as to maximize communication terminal availability. Additional tolerances may include limitations on establishing communications based on a time-of-day, network connection bandwidth, temporal proximity to other scheduled video visits, an availability of security personnel to monitor video calls, and other similar factors.

While many examples are provided herein in the context of a correction facility, the principles of the present disclosure contemplate other types of controlled facilities as well. For example, businesses and governmental entities (e.g., administrative or military) are all considered within the scope of the present disclosure. Furthermore, although many examples provided herein describe a resident's location information being stored in memory, permission is granted for each resident to have such resident location information stored. In the context of a detention environment, permission may be granted by the resident being present in the detention environment, or by another entity with appropriate legal authorization to grant permission to track the location of the resident in the detention environment. Each resident can be provided notice that such resident information will be stored. The stored resident information may be encrypted to protect resident security.

FIG. 1 illustrates an example architecture 100 for providing video communications with a detention environment. The architecture 100 illustrates a detention environment 102 that includes communications terminals 110 connected to a network 150 through a communications firewall 114 using a communications manager 112. The architecture 100 also includes a communications server 130 as described herein connected to the network 150 through a communications server firewall 132. The firewalls 114 and 132 can be software-based or hardware-based. The architecture further includes clients 180 for use by outside contacts to conduct a video visit using the disclosed system. The clients 180 can be, for example, desktop computers, mobile computers, tablet computers (e.g., including e-book readers), mobile devices (e.g., a smartphone or PDA), or any other devices having appropriate processor, memory, and communications capabilities for conducting a video visit (e.g., having a camera, a microphone, and a display).

Each of the communications terminals 110 is connected to a communications manager 112. In certain aspects, for purposes of load balancing, the communications terminals 110 can be connected to many communications managers. The communications terminals 110 can be audio communication terminals, video communication terminals, tactile communications terminals (e.g., for the visual and/or hearing impaired), or other terminals configured for communication between two or more individuals. For purposes of the system disclosed herein, the communications terminals 110 are configured for use with video visits. In certain aspects, the communication terminals can be mobile, such as mobile smartphones or mobile kiosks. The communications manager 112 to which the communications terminals 110 are connected can be, for example, a networking device such as a router, gateway, or switch. The communications manager 112 can be configured for various protocols of communication including, for example, Internet Protocol (IP), voice over IP (VoIP), audio and video Internet telephony network protocols, or telephone switching.

The communications manager 112 is connected to the network 150, such as the Internet, a metropolitan area network (MAN), a wide area network (WAN), a broadband network (BBN), and the like. Further, the network 150 can include, but is not limited to, any one or more of the following network topologies, including a bus network, a star network, a ring network, a mesh network, a star-bus network, tree or hierarchical network, and the like. In certain aspects where the communications server 130 is located at the detention environment 102, the network 150 can include, for example, any one or more of a personal area network (PAN), a local area network (LAN), or a campus area network (CAN). The connection between the communications manager 112 and the network 150 can be protected using a communications firewall 114, which can be particularly relevant to protecting the security of the detention environment 102 by limiting log ins to devices in the detention environment 102 to authorized individuals or processes.

The communications server 130 is connected to the network 150 through the communications server firewall 132. The communications server 130 is responsible for hosting an application for providing video communications with a detention environment between a detainee in the detention environment and a outside contact not in the detention environment. The communications server 130 can be any device having an appropriate processor, memory, and communications capability for providing video communications in the detention environment between the detainee and the outside contact.

The communications terminals 110 and the clients 180 each include an application configured to permit a video visit between a communications terminal 110 and a client 180 using a network service provided by the communications server 130. This allows the communications terminals 110 and clients 180 kept by the friends and family members to be continuously updated on visitation requests, availability, waiting messages, and other types of updates. For instance, on a client 180 that is a portable computing device, an application (or "app") configured for use with the communications server 130 to conduct a video visit can be downloaded and installed. When a request or other notification is generated for a video visit with the outside contact associated with the client 180, a push notification can be sent to the application on the client 180. Push notifications and other server-initiated messages advantageously permit the application to include current information (e.g., regarding scheduling and availability), and further permit responses to incoming visitation requests to occur very quickly by providing a substantially immediate notification to both the communications terminal 110 and the client 180.

The application on the communication server 130 can thus permit a detainee or an outside contact associated with a detainee outside of the detention environment to initiate an immediate video visitation without having to schedule the video visitation sufficiently in advance. Furthermore, the application permits either party to make a request for a video visit, and then updates both parties on the status of the request and the actual availability of the other party.

For example, if the video visit is initiated by the detainee, the system first checks to see if there are any known conflicts, such as when an outside contact has specified that he does not wish to participate in visits during work hours. If the outside contact has no such restrictions at the current time, a request for an immediate video visitation is sent according to various communications channels, including a message sent to a smartphone application of the outside contact that in turn alerts the outside contact to a request for a visitation visit, a text message (e.g., Short Message Service message or Multimedia Messaging Service message) sent to the outside contact requesting a visitation visit, an automated phone call to the outside contact informing the outside contact that a detainee has requested an immediate video visit, an email informing the outside contact that a detainee has requested an immediate video visit, or an onscreen message in an application (e.g., a web browser) on the client 180 informing the outside contact about the request.

As another example, if the visit is initiated by the outside contact, the system first checks to ensure that the detainee is available (e.g., not currently video visiting someone else or having mealtime restrictions or in lockdown). If no such restriction currently exists for the detainee, the detainee is notified by an onscreen message and/or an audio prompt at the communications terminal 110 that an immediate visit has been requested. The audio prompt may include the detainee's name.

For an outside contact with a video-chat enabled client 180, such as a smartphone or tablet computer, the client application 268 may be installed on the client 180 that allows the friend, family member, or other outside contact to have the ability to initiate or receive a video call at almost any time. However, the friend or family member may not wish to receive a video call at any time, or may not be allowed to engage in such communications at all times, such as while driving, at work, at a doctor's office, or elsewhere where they do not wish to be seen communicating with the detainee. Said application will thus allow the party to indicate a schedule, activities, and/or locations during which he will allow and disallow incoming visit requests. The client application 268 allows the visit availability indication to be set for any of these conditions, including detecting its current location to be at work (via global positioning system coordinates, the identity of available wireless networks, etc.). Alternately, the outside contact may wish to be available at all time for a detainee call. If the outside contact permits, the client application 268 may use a plurality of scheduling data available for the outside contact, including online calendar systems, free/busy time reports, and other calendar related information.

The outside contact may thus select filters indicating, for example, a date range during which the outside contact may be contacted, types of data filtering, or limiting which detainees can contact the outside contact. Alternatively, the outside contact may skip selecting filters and have default restrictions applied.

Figure 2:
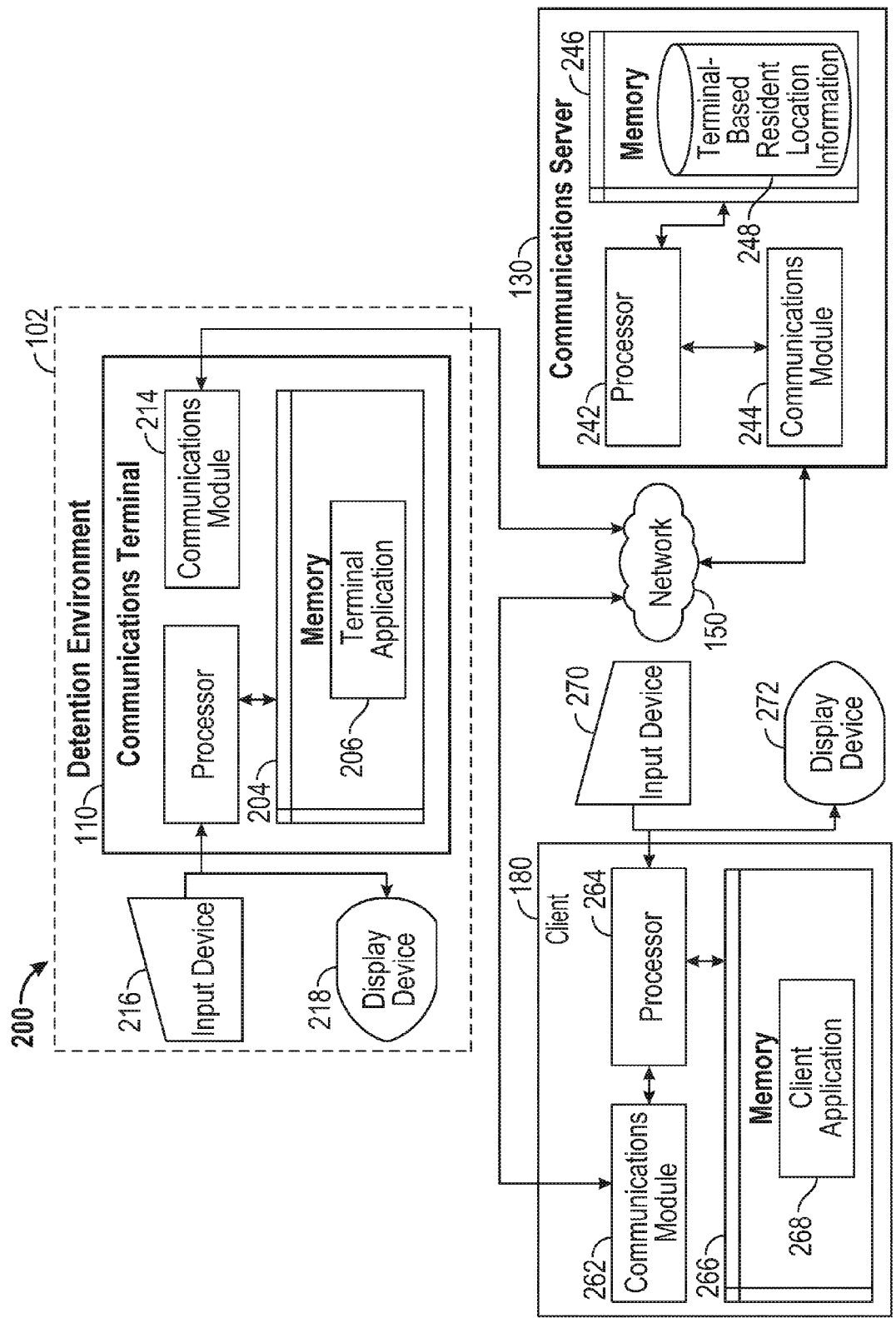
FIG. 2 is a block diagram illustrating an example communications terminal, server, and client from the architecture of FIG. 1 according to certain aspects of the disclosure.

FIG. 2 is a block diagram 200 illustrating an example communications terminal 110, communications server 130, and client 180 in the architecture 100 of FIG. 1 according to certain aspects of the disclosure. The communications terminal 110, facility management server 120, and communications server 130 are connected over the network 150 via respective communications modules 214, 244, and 262. The communications modules 214, 244, and 262 are configured to interface with the network 150 to send and receive information, such as data, requests, responses, and commands to other devices on the network 150. The communications modules 214, 244, and 262 can be, for example, modems or Ethernet cards.

The communications terminal 110, which can be a videophone, includes a processor 212, the communications module 214, and a memory 204 that includes a terminal application 206. The application is configured to communicate with the communications server 246 to conduct a video call between the communications terminal 110 in the detention environment 102 and a client 180. The communications terminal 110 also includes an input device 216 and an output device 214, such as a display. The input device 216 can include, for example, a keyboard, a touchpad, a microphone, a camera, touchscreen, or mouse.

The communications server 130 includes a processor 242, the communications module 244, and a memory 246 that includes a server application 248. The processor 242 of the communications server 130 is configured to execute instructions, such as instructions physically coded into the processor 212, instructions received from software (e.g., server application 248) in memory 246, or a combination of both, to receive a request from a first user to initiate a video communication with a second user. The video communication uses a shared communications terminal 110 located in a detention environment 102. The processor 242 is also configured to determine, based on a schedule of the second user, whether the second user is available for participating in the video communication. One of the first user and the second user is detained in the detention environment 102. In certain aspects, the other of the first user and the second user is not detained in the detention environment 102.

In certain aspects, the schedule of the second user can indicate current restrictions for accessing the shared communications terminal 110, such as, for example, a lockdown in the detention environment 102, a mealtime restriction in the detention environment 102, or an emergency situation at the detention environment 102. The schedule of the second user can include a calendar of availability of the second user, such as a personal calendar stored in the memory 266 of or otherwise accessible to the client 180.

When the determination indicates the second user is available for participating in the video communication, the processor 242 of the communications server 130 is configured to send a notification to the second user to accept the request to initiate the video communication. For example, where the first user is detained in the detention environment 102, the notification is sent by the processor 242 to the client 180 associated with the second user. In certain aspects where the second user is detained in the detention environment 102 and the shared communications terminal 110 is one of a plurality of shared communications terminals 110 in the detention environment 102, the processor 242 is configured to send the notification to one or more of the plurality of shared communications terminals 110 to which the second user has physical access. The shared communications terminal 110 can be identified, for example, based on detainee location information accessible to the communications server 130. The notification can be sent to the shared communication terminal 110 as an audible notification or a visible notification produced by the shared communications terminal 110. For instance, the shared communication terminal 110 can audibly announce "incoming call for detainee [detainee name]," or visibly display an alert, optionally accompanied with a sound, having the same language. In certain aspects, if multiple shared communication terminals 110 are accessible to an inmate (e.g., whether in the detainee's pod, shared, or common rooms such as a library), the unused shared communication terminals 110 may display the notification for the detainee such that the notification can be accessed by detainees from more than one room or pod. The communication session would then start at whichever shared communication terminal 110 the detainee logs into.

The processor 242 is configured to receive a response to the notification to the second user to accept the request to initiate the video communication. In certain aspects where the second user is detained in the detention environment 102, and the notification is sent to the shared communications terminal 110, the response to the notification can indicate the second user is not available to initiate the video communication when the notification to accept the request to initiate video communication is not accepted within a set time limit. If, however, the response to the notification indicates the second user has accepted the request to initiate the video communication, the processor 242 is configured to initiate the video communication between the first user and the second user.

The processor 242 can be configured to end the video communication between the first user and the second user based on a change in the first user's availability. For instance, when the change in the first user's availability indicates a lockdown being initiated in the detention environment 102, a mealtime restriction being placed in the detention environment 102, an emergency situation occurring at the detention environment 102, or a previously scheduled video communication at that or any free terminal with another inmate is to begin soon, the processor 242 of the communications server 130 can automatically end the video communication.

Figure 3:
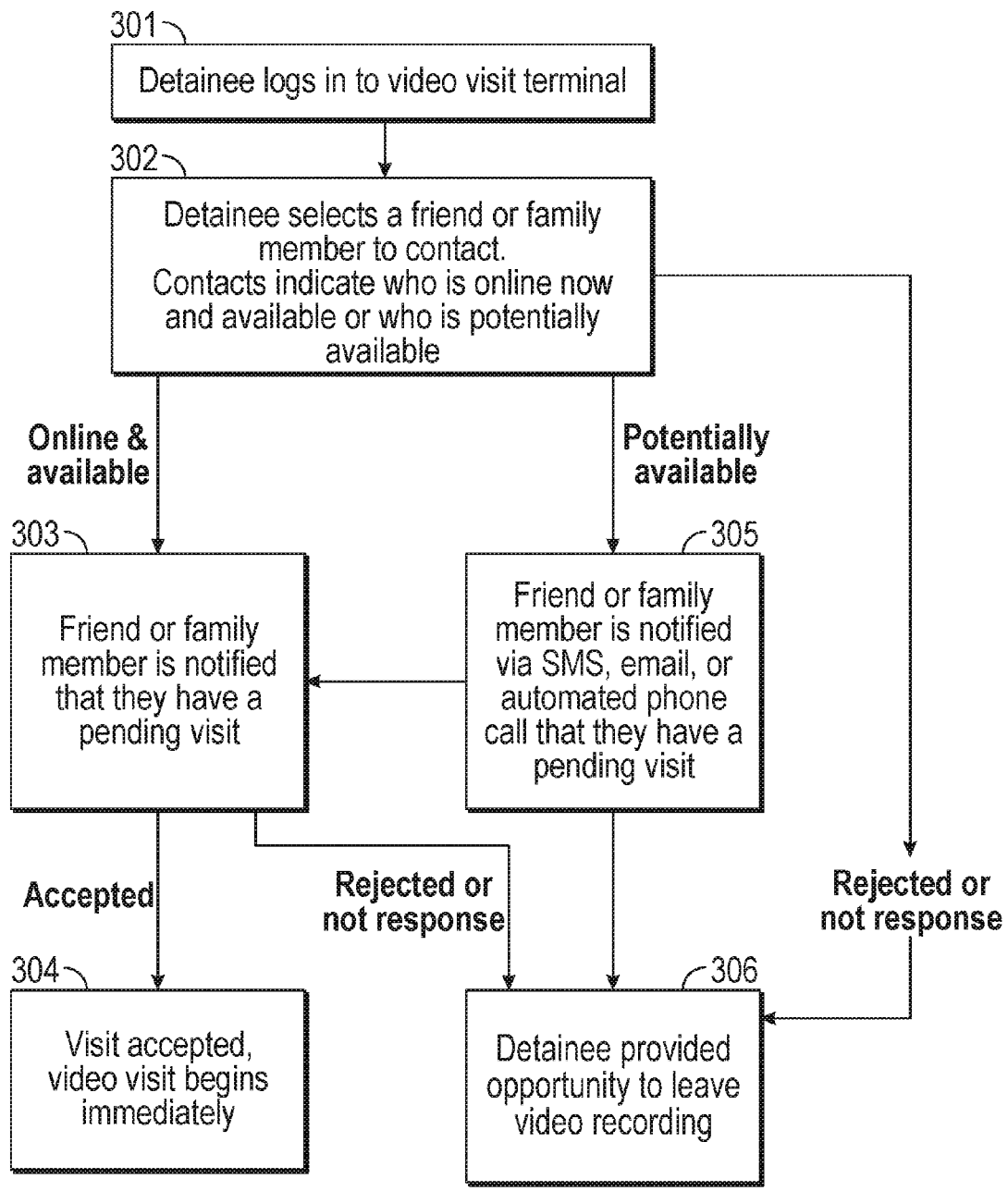
FIG. 3 illustrates an example process for a detainee to conduct a video visit with a guest (e.g., family member or friend) using the example communications terminal of FIG. 2.

FIG. 3 illustrates an example process 300 for a detainee to conduct a video visit with a guest (e.g., family member or friend) using the example communications terminal 110 of FIG. 2. While FIG. 3 is described with reference to FIG. 2, it should be noted that the process steps of FIG. 3 may be performed by other systems. The process 300 begins by proceeding to step 301 when a detainee logs into a communications terminal 110 that allows for video visitation. Next, in step 302, the communications terminal 110 displays a list of online and available friends and family members and optionally includes the date and time of their last visit. For each of the detainee's contacts, the system checks for contact availability. Friends and family members are able to set their status to unavailable or schedule time periods, such as work hours, when they do not wish to be disturbed or to otherwise conduct a visit. Contacts may be sorted, for instance, alphabetically, or to bring contacts that the detainee has contacted recently to the top, or to bring contacts that not recently been contacted to the top (e.g., to encourage more contact). In step 303, the online and available friend or family member is notified that the friend or family member has a pending visit.

A separate list may be presented listing authorized outside contacts who are not online, but have indicated potential availability in their schedules. The communications terminal 110 may offer the detainee the ability to send an immediate video visit request to these individuals via text message and/or push notifications to a client application 268 on a client 180. In step 305, the friend or family member receives a text message informing the friend or family member that the detainee wishes to have a video visit. This text message can contain an address for launching the client application 268 using the processor 264 of the client 180 if received on a smartphone, tablet computer, or other computer. When the friend or family member receives the request (e.g., in the client application 268), that outside contact can either accept the visit, or decline the visit, such as by selecting a predefined reason (e.g., "I'm at work", "I'm busy", etc.) and optionally scheduling the soonest or other future video visit available based on the confluence of the friend or family member's schedule, detainee terminal availability, and detention environment 102 video visit rules. While attempting to establish the video visit, a graphical countdown timer may be shown on the display device 218 of the communications terminal 110, such as a vertical bar reducing in height as time elapses. If the video visit is accepted by the friend or family member, the video visit begins immediately in step 304.

If the instant video visit is not established within a pre-defined period of time, or if the visit is rejected, the requester is offered the chance to record a video message in step 306. If the requester records a video message, the requester is given the opportunity to review and optionally re-record it before sending. While recording the message, a graphical countdown timer may be shown, again such as a vertical bar, reducing in height as remaining allowed time for the video message elapses. Upon viewing any video mail message, both detainees and visitors are provided with an interface for flagging inappropriate content, such as threats against the recipient, threats to harm themselves (e.g., a suicide threat), or other problematic behavior. In certain aspects, because all messages (except privileged communications, such as those with an attorney) are recorded and preserved by the communications server 130 for viewing by detention environment staff and other authorized personnel, the content of the above-flagged messages can be automatically forwarded to the appropriate personnel, optionally according to the type of message flag. For example, the message can be forwarded to law enforcement if the message is flagged as a threat to the other party, or the message can be forwarded to a mental health professional if the message is flagged as a threat to harm oneself or as depressed behavior.

Figure 4:
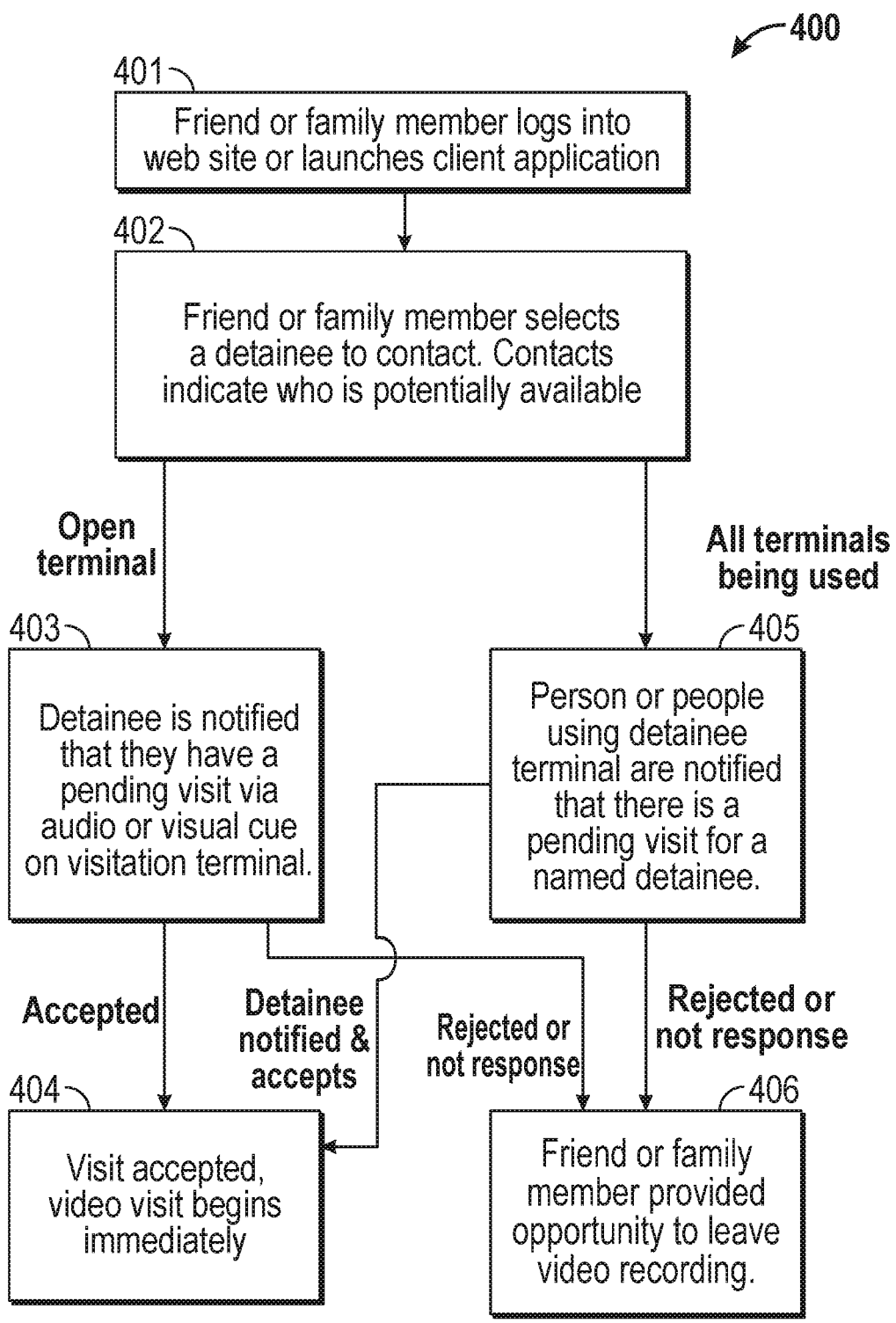
FIG. 4 illustrates an example process for an outside contact to conduct a video visit with a detainee using the example client of FIG. 2.

FIG. 4 illustrates an example process 400 for an outside contact to conduct a video visit with a detainee using the example client 180 of FIG. 2. In step 401, a friend or family member launches client application 268, or logs into a website (e.g., using input device 270) associated with the client application 268. The friend or family member presented (e.g., on display device 272) with a list of the detainees with whom the friend or family member is authorized to visit. The detainees may be pre-filtered to ensure that they have access to the necessary communications terminal 110 at the time of the request. Mealtime or lockdown are two examples of time periods when the communications terminal 110 is likely unavailable to the detainee, and the friend or family member may be prevented from an instant video visit with that detainee. Detainees may also be pre-filtered to prevent an instant visit by a detainee who only has access to communications terminals 110 that are already being used for other video visits or other purposes (e.g., such as filing a request or typing a message), or are scheduled to be used for video visits (or other purposes) at a time that overlaps the estimated duration of the requested video visit. In step 402, the friend or family member selects an available detainee and requests an instant visit. The client application 268 may ask the friend or family member in advance for how long the friend or family member is available for to allow a time slot on the detainee side to be reserved. This prevents conflicts with others who may wish to schedule a video visit on the same device for an overlapping time period. In certain aspects, the server application 248 may compare the requested visit with communications terminal 110 and/or detainee availability (e.g., detention environment visitation rules, detainee terminal availability, and detainee schedule). If the friend or family member, detainee, and communications terminal 110 are all available during an overlapping window, the client application 268 informs the friend or family member that a visit is possible.

In step 403, if the detainee is logged in to a communications terminal 110 or a communications terminal 110 is otherwise available, the detainee is asked whether the detainee will accept incoming visit request. If the detainee is not logged in to a communications terminal 110, the server application 248 sends a visual and/or audible alert to all, or a subset of all, communications terminals 110. If the detainee accepts the request in step 404 at an available communications terminal 110, the video visit begins.

In step 405, if the detainee is available but all communications terminals 110 are being used, the server application 248 system picks the communications terminal 110 with lowest-priority use (e.g. playing a game) and informs the current user of the communications terminal 110 of an incoming call request, saves the current user's session, and asks the current user to inform the detainee receiving the visit request about the incoming call request.

If the detainee is not logged in to any communications terminal 110 at the time of the request and has not logged in within a brief period of time (e.g., one minute) of the notification, an alert may be displayed on every communications terminal 110 in use for something other than a visitation asking the user of the terminal to notify the detainee being called. If the user succeeds in notifying the other detainee (preferentially determined by user logging out of the terminal and the called detainee logging into the same terminal to accept the incoming visit), a record of this gesture may be stored in the user's account. This record may be used as an incentive by the correctional staff, as a means of encouraging good behavior or as a digital coupon for free or discounted future communications terminal 110 usage. If the instant video visit is not established within a pre-defined period of time, or if the detainee rejects the request, the friend or family member requesting the visit is provided with a chance to record a video message for the detainee in step 406. If the friend or family member records a video message, the friend or family member is given the opportunity to review and optionally re-record the video message before the video message is sent to the detainee.

Figure 5:
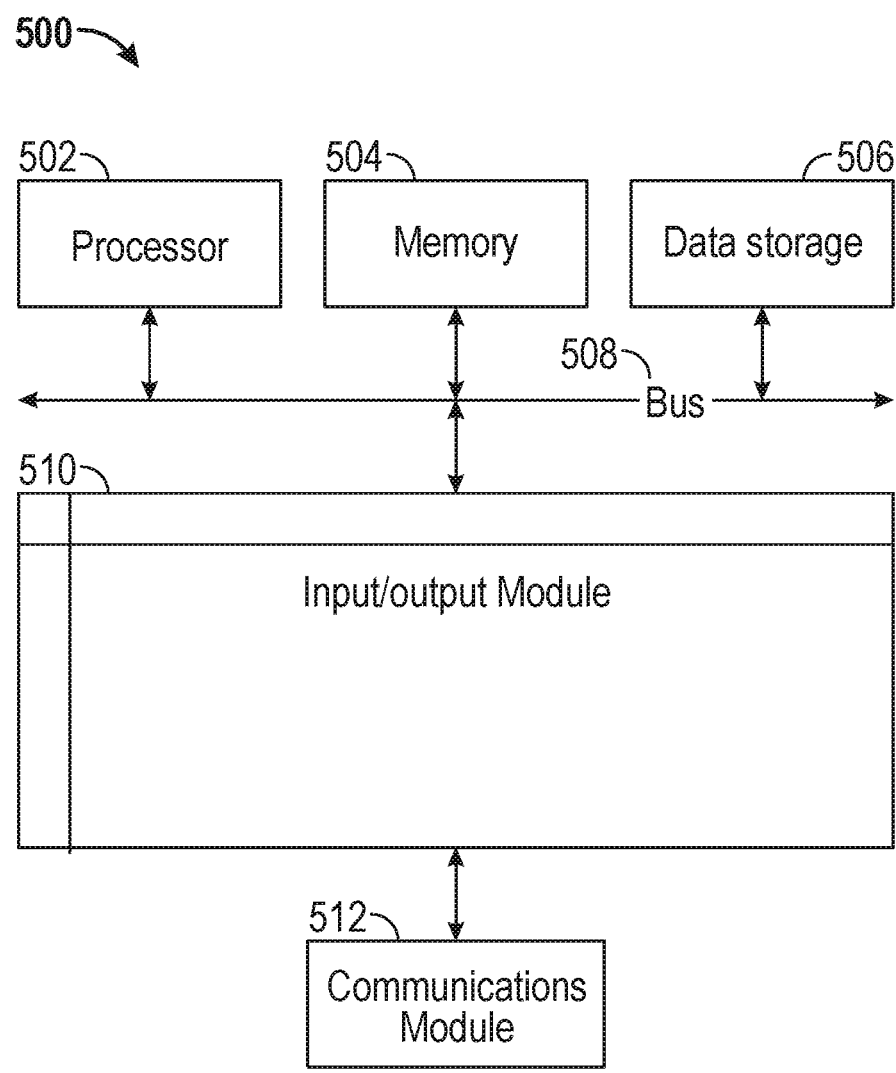
FIG. 5 is a block diagram illustrating an example computer system with which the example communications terminal, server, and client of FIG. 2 can be implemented.

FIG. 5 is a block diagram illustrating an example computer system 500 with which the communications terminal 110, communications server 130, and the client 180 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., communications terminal 110, communications server 130, and the client 180) includes a bus 508 or other communication mechanism for communicating information, and a processor 502 (e.g., processor 212, 242, and 264) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 204, 246, and 266), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 (e.g., communications module 214, 244, and 262) include networking interface cards, such as Ethernet cards and modems. In certain aspects, the input/output module 510 is configured to connect to a plurality of devices, such as an input device (e.g., input device 216 and 270) and/or an output device (e.g., display device 218 and 272). Example input devices include a keyboard and a pointing device, e.g., a mouse or a trackball, by which a user can provide input to the computer system 500. Other kinds of input devices can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices include display devices, such as a LED (light emitting diode), CRT (cathode ray tube), or LCD (liquid crystal display) screen, for displaying information to the user.

According to one aspect of the present disclosure, the communications terminal 110, communications server 130, and the client 180 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a PAN, LAN, CAN, MAN, WAN, BBN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 502 for execution. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

These and other implementations are within the scope of the following claims.

What is claimed is:

1. A machine-readable non-transitory storage medium comprising machine readable instructions for causing a processor to execute a method for providing a video communication with a detention environment, the method comprising:

receiving a request from a first user to initiate a video communication with a second user, the video communication using a shared communications terminal located in a detention environment, wherein one of the first user or the second user is detained in the detention environment;

determining, based on a schedule of the second user, whether the second user is currently available for participating in the video communication;

when the determination indicates the second user is currently available for participating in the video communication, sending a notification to the second user to accept the request to initiate the video communication;

receiving a response to the notification to the second user to accept the request to initiate the video communication;

initiating the video communication between the first user and the second user when the response to the notification indicates the second user has accepted the request to initiate the video communication;

ending the video communication between the first user and the second user based on a previously scheduled video communication associated with another user that is detained in the detention environment, when the determination indicates the second user is currently not available for participating in the video communication, providing the first user with an opportunity to record a message;

wherein the first user is detained in the detention environment and the second user is not detained in the detention environment, the method further comprising:

flagging the message based on a content type associated with the message;

forwarding the flagged message to a predetermined recipient associated with the content type; and receiving user input associated with the message, the received user input comprising information indicative of the content type of the message, wherein the flagging occurs in response to the received user input, and wherein the received user input is from personnel associated with the detention environment.

2. A system for providing a video communication with a detention environment, the system comprising:
a memory comprising instructions; and
a processor configured to execute the instructions to:
receive a request from a first user to initiate a video communication with a second user, the video communication using a shared communications terminal located in a detention environment, wherein one of the first user or the second user is detained in the detention environment;
determine, based on a schedule of the second user, whether the second user is currently available for participating in the video communication;
when the determination indicates the second user is currently available for participating in the video communication,
send a notification to the second user to accept the request to initiate the video communication;
receive a response to the notification to the second user to accept the request to initiate the video communication;
initiate the video communication between the first user and the second user when the response to the notification indicates the second user has accepted the request to initiate the video communication;
end the video communication between the first user and the second user based on a previously scheduled video communication associated with another user that is detained in the detention environment;
when the determination indicates the second user is currently not available for participating in the video communication, provide the first user with an opportunity to record a message;
wherein the first user is detained in the detention environment and the second user is not detained in the detention environment:
flag the message based on a content type associated with the message; and
forward the flagged message to a predetermined recipient associated with the content type; and
receive user input associated with the message, the received user input comprising information indicative of the content type of the message, wherein the flagging occurs in response to the received user input, wherein the received user input is from personnel associated with the detention environment.

* * * * *